(12) United States Patent
Mbadinga Mouanda et al.

(10) Patent No.: US 11,536,382 B2
(45) Date of Patent: Dec. 27, 2022

(54) VALVE BODY FOR A VALVE, AND VALVE

(71) Applicant: MANN+HUMMEL GmbH, Ludwigsburg (DE)

(72) Inventors: Gelase Mbadinga Mouanda, Sachsenheim (DE); Thomas Jessberger, Asperg (DE); Coskun Evlekli, Waiblingen (DE); Claus Fischer, Fellbach (DE); Dennis Viellieber, Korntal-Muenchingen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

(21) Appl. No.: 17/392,940

(22) Filed: Aug. 3, 2021

(65) Prior Publication Data
US 2022/0025979 A1    Jan. 27, 2022

Related U.S. Application Data

(63) Continuation of application No. PCT/EP2020/052040, filed on Jan. 28, 2020.

(30) Foreign Application Priority Data

Feb. 4, 2019  (DE) .................... 10 2019 102 724.1

(51) Int. Cl.
*F16K 15/02* (2006.01)
*F01M 13/00* (2006.01)

(52) U.S. Cl.
CPC ....... *F16K 15/021* (2013.01); *F01M 13/0011* (2013.01)

(58) Field of Classification Search
CPC .. F16K 15/021; F16K 15/06; F16K 2200/502; F01M 13/0011;
(Continued)

(56) References Cited

U.S. PATENT DOCUMENTS 922,986 A  *  5/1909  Westaway ............... F16K 15/16
                                                137/516.11
1,974,533 A  *  9/1934  Evans ..................... F16K 15/02
                                                137/902
(Continued)

FOREIGN PATENT DOCUMENTS

CN    104864093 A  *  8/2015  ............. F16J 15/022
CN    106812979 A     6/2017
(Continued)

*Primary Examiner* — Marina A Tietjen

(57) ABSTRACT

A valve body for a valve has an envelope surface with a bell-shaped cross section contour in a longitudinal direction of the valve body. The envelope surface is provided with a guide region for guiding the valve body in a valve seat and is further provided with a sealing region for contacting fluid-tightly the valve seat. The sealing region adjoins in the longitudinal direction the guide region. The bell-shaped cross section contour in the longitudinal direction from the guide region to the sealing region is open at one side and increases strictly monotonously. The valve body is formed of a thermoplastic polyhalogen olefin. A crankcase ventilation device is provided that is provided with a valve provided with such a valve body.

17 Claims, 12 Drawing Sheets

(58) Field of Classification Search
CPC ...... F01M 2013/0016; Y10T 137/7904; Y10T 137/7913–7915; Y10T 137/7917; Y10T 137/7919–792
See application file for complete search history.

(56) References Cited

U.S. PATENT DOCUMENTS

| | | | | |
|---|---|---|---|---|
| 3,513,875 A | * | 5/1970 | Nelson | .................... F16K 7/00 137/533.19 |
| 3,542,059 A | * | 11/1970 | Blanchard | ............... F16L 55/00 137/433 |
| 3,978,886 A | * | 9/1976 | Mathis | .................. A61H 33/60 4/492 |
| 4,059,127 A | | 11/1977 | Olson | |
| 4,416,108 A | * | 11/1983 | Ghandhi | .................. F02M 5/08 220/749 |
| 4,579,135 A | | 4/1986 | Sakata | |
| 4,655,248 A | * | 4/1987 | Chalaire | ............... F16K 15/021 137/515.7 |
| 4,919,167 A | * | 4/1990 | Manska | ................ F16K 15/141 137/853 |
| 5,375,621 A | * | 12/1994 | Gaehwiler | ............ F16K 15/148 137/220 |
| 10,156,293 B1 | | 12/2018 | Bennett | |
| 2001/0020415 A1 | | 9/2001 | Osterlanger | |
| 2004/0159355 A1 | * | 8/2004 | Vasilev | ................... F16K 15/02 137/528 |
| 2005/0081922 A1 | | 4/2005 | Beck | |
| 2017/0241309 A1 | * | 8/2017 | Coolens | ............... F16K 24/044 |

FOREIGN PATENT DOCUMENTS

| | | | | |
|---|---|---|---|---|
| EP | 0674128 A2 | | 9/1995 | |
| EP | 1215427 A1 | | 6/2002 | |
| GB | 1247407 A | * | 9/1971 | |
| GB | 2493626 A | * | 2/2013 | ........... F16K 15/021 |
| WO | WO-2011067035 A1 | * | 6/2011 | ......... F02M 25/0836 |
| WO | WO-2015111072 A2 | * | 7/2015 | ............... F16K 1/36 |

* cited by examiner

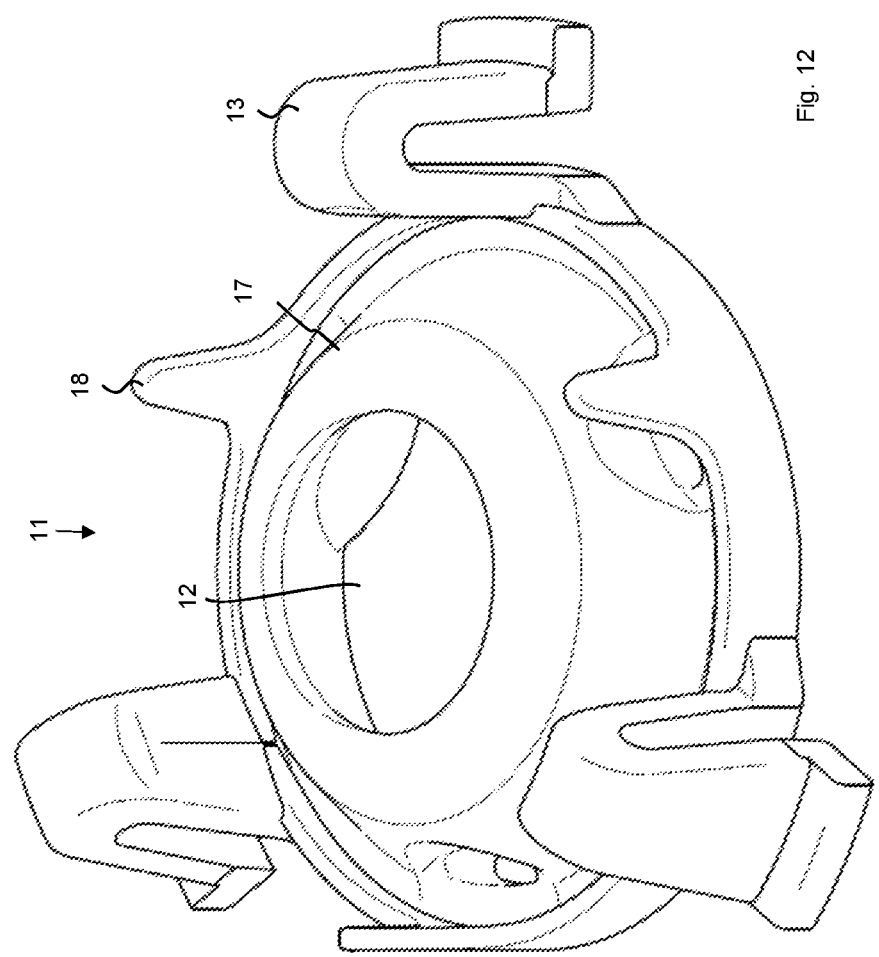

VALVE BODY FOR A VALVE, AND VALVE

CROSS-REFERENCE TO RELATED APPLICATIONS

This application is a continuation application of international application No. PCT/EP2020/052040 having an international filing date of 28 Jan. 2020 and designating the United States, the international application claiming a priority date of 4 Feb. 2019 based on prior filed German patent application No. 10 2019 102 724.1, the entire contents of the aforesaid international application and the aforesaid German patent application being incorporated herein by reference.

BACKGROUND OF THE INVENTION

The invention concerns a valve body for a valve with an envelope surface which comprises a bell-shaped cross section contour in a longitudinal direction of the valve body, comprising a guide region for guiding the valve body in a valve seat and a sealing region for fluid-tight contact at the valve seat.

Moreover, the invention concerns a valve with a valve seat and a valve body according to the invention, which are arranged in a valve housing.

Finally, the invention concerns a crankcase ventilation device with at least one valve according to the invention.

The invention will be disclosed in the following based on the example of its use in an internal combustion reciprocating piston engine.

In such internal combustion engines, it is not possible to achieve a complete sealing action at the piston rings between the piston and the cylinder wall. The requirement of a low friction between these components and the requirement of a sealing action as complete as possible between them are contrary here. A compromise must be found between these two requirements. This means that no complete sealing action can be achieved. Oil-containing leakage gas (so-called "blow-by") can thus bypass the piston and reach the crankcase. In this context, in principle three different paths for escape of the leakage gas can be differentiated: On the one hand, the leakage gas can escape through gaps in the piston rings, on the other hand, it can escape between the piston ring and the cylinder wall, and, finally, between the piston ring and the piston. The oil-containing leakage gas that has escaped in such a way into the crankcase must now be supplied again to the combustion process. This is performed in closed crankcase ventilation devices (closed crankcase ventilation—CCV).

Such crankcase ventilation devices, depending on the field of application, can be constructed differently. In an exemplary embodiment of such a crankcase ventilation device, the oil-containing leakage gas is first guided into an oil separator in whose return line an oil return flow check valve can be arranged. This oil return flow check valve prevents that oil is accidentally sucked in (which could cause damages in the internal combustion engine). Moreover, further pressure regulating valves (for purified leakage gas) or other non-return check valves that are required for regulating the pressure in the crankcase can be provided downstream of the oil separator.

These different valves are typically embodied differently in regard to construction. Therefore, they comprise typically also a different closure behavior, respectively. In this context, for an efficient crankcase venting action, a closing of the valves as early as possible already for very minimal vacuum values must occur and an oil drainage already at very low oil quantity weights.

SUMMARY OF THE INVENTION

It is therefore the object of the invention to efficiently design the venting action of a crankcase in a universal and simple manner, in particular to optimize the opening and/or closing behavior of a crankcase ventilation valve with respect to low switching pressures.

This object is solved by the valve body according to the invention in that its cross-section contour in the longitudinal direction from the guide region to the sealing region is configured to be open at one side and increases strictly monotonously. The valve body comprises a thickened envelope surface which substantially forms the valve body and provides structure. In this context, the sealing region is embodied to adjoin the guide region in the longitudinal direction wherein adjoining can be a direct or indirect adjoining, i.e., for example, with interposition of one or a plurality of further regions.

The valve body comprises thus a three-dimensional geometry which is manifested in an open and strictly monotonous, (substantially) bell-shaped cross section contour. The valve body according to the invention differs thus from the valve bodies with a rubber seal and a plastic ball that are typically employed in the example of an internal combustion reciprocating piston engine.

The valve body according to the invention also comprises at least two functional regions which are provided in its geometric configuration.

On the one hand, a guide region is provided. This guide region serves for guiding and centering the valve body in a valve seat. Additional components, for example, spring elements or the like that are to effect guiding of the valve body in the valve seat, can be dispensed with. A simple and inexpensive manufacture of the valve body, respectively, of the associated valve is possible.

On the other hand, a sealing region is provided. This sealing region serves for contacting the valve seat. This contact is embodied fluid-tightly when the valve associated with the valve body is in a closed state. Again, additional components that are to provide the sealing action of the valve body against the valve seat can be dispensed with. A simple and inexpensive manufacture of the valve body or of the associated valve is possible.

The cross-section contour increases strictly monotonously in a direction from the guide region to the sealing region in longitudinal direction of the valve body. This means that there exist no neighboring points in longitudinal direction of the valve body on the envelope surface for which a distance from a longitudinal center axis of the valve body is identical. No cylindrical regions are provided in the valve body; the distance of the envelope surface from the longitudinal center axis of the valve body increases strictly monotonously from the guide region to the sealing region.

This strictly monotonous increase of the cross-section contour and the geometry of the valve body that is open at one side enable its simple and inexpensive manufacture. As a starting material, a film (e.g. of polytetrafluoroethylene) can be employed. The latter is then brought into the desired strictly monotonous, (substantially) bell-shaped geometry that is open at one side, for example, by deep drawing or thermoforming.

The valve body according to the invention can be used in an advantageous manner in a plurality of valves of a crankcase ventilation system, e.g. as a non-return check valve (for partial load, full load and/or fresh air) and/or as oil return flow check valve.

According to the invention, the valve body is formed of a thermoplastic plastic material, namely a polyhalogen olefin. Polyhalogen olefins such as polytetrafluoroethylene exhibit a good chemical resistance and are suitable in particular for the use in lubricant oil environments of internal combustion engines.

In this context, it is advantageous that the guide region is embodied as a cone-shaped shaft extending in the longitudinal direction and the sealing region comprises a cone-shaped sealing section.

In a preferred embodiment, it can be provided that the bell-shaped cross section contour, viewed in longitudinal direction, is embodied closed at a side of the guide region which is facing away from the sealing region, which is further favorable for the afore described preferred manufacture by means of deep drawing.

The cone-shaped shaft which takes on the function of the guide region of the valve body extends at least partially through the opening of the valve seat. This is the case in the closed state of the valve as well as in its open state. In this way, centering of the valve body on the valve seat is achieved. The valve body comprises a defined initial position in relation to the valve seat. This enables on the one hand a permanent centering of the valve body in relation to the valve seat. On the other hand, it also enables centering of the valve body for all conceivable installation positions of the valve that comprises the valve body; centering can be achieved for vertical or horizontal or other installation positions in relation to the direction of the force of gravity. Since the cross section contour of the valve body is open at one end at the side of the valve body which is facing the sealing region, the cone-shaped shaft is of a closed configuration at its axial end.

The sealing region comprises a cone-shaped sealing section. This cone-shaped sealing section comes into a fluid-tight contact at the valve seat of the valve associated with the valve body when the valve body is sucked against the valve seat by a vacuum upon closing of the valve. The cone-shaped sealing section seals then against the corresponding sealing line of the valve seat. In this context, the diameter of the cone-shaped sealing section in a radial direction of the valve body is configured such that it is matched to a diameter of the valve seat at the corresponding sealing line (e.g. is slightly larger) in order to keep the pressure differences in the valve as low as possible.

The ratio of a diameter of the shaft in the radial direction of the valve body to a diameter of the sealing section in the radial direction of the valve body can be in a range between 2/5 and 2/100. Particularly preferred in this context is a range between 2/10 and 2/25.

In principle, the diameter of the sealing section, which comprises preferably an annular shape, or its width is to be selected as small as possible in order to keep the flow resistance in opening direction, and thus the pressure loss upon flow in an open valve state, as small as possible.

It is also preferred that, for adaptation of a flow resistance of the valve body, the guide region is configured together with the sealing region by means of a flow guiding region, which connects the guide region to the sealing region, at least in sections thereof without material interruptions.

The flow guiding region provides the third functional region of the valve body. It provides in this context an inflow surface (as large as possible) in a closing direction of the valve. Due to the geometric configuration of the flow guiding region, it is possible to adapt or optimize the flow resistance of the valve body to the respective required values. An early closure of the valve associated with the valve body is enabled already at low vacuum values. Also, an efficient oil drainage can be adjusted even for low oil level. The valve will open early on even for minimal oil quantity weights for drainage purposes.

In this context, it is advantageous that the flow guiding region comprises at least one pressure compensation opening that connects an inner side of the envelope surface with an outer side of the envelope surface and penetrates the cross-section contour.

One or a plurality of pressure compensation openings can be provided in the flow guiding region. These pressure compensation openings "penetrate" the envelope surface of the valve body and thus open a channel or channels from the exterior side of the envelope surface (the side of the valve body which is facing the valve seat) to the inner side of the envelope surface (the side of the valve body which is facing away from the valve seat). These channels serve, on the one hand, for reducing the pressure difference in an open state of the valve associated with the valve body. On the other hand, they serve however also for drainage purposes for oil. Preferably, the plurality of pressure compensation openings can be present on a common radius.

The flow guiding region is positioned in particular, viewed in radial direction, between the guide region and the sealing region. In axial direction, the flow guiding region is also positioned between the guide region and the sealing region because the bell-shaped cross section contour of the valve body in the longitudinal direction is embodied to increase strictly monotonously.

Also, as a whole it is advantageous that the cone-shaped sealing section comprises a cone angle in a range between 25 degrees and 65 degrees, preferably in a range between 35 degrees and 55 degrees, and in particular preferred of 45 degrees.

For these values of the cone angle, a particularly efficient sealing behavior of the sealing section against the valve seat can be achieved.

Furthermore, it is preferred in all this that a thickness of the cross-section contour is embodied in a range of 1/10 mm to 1 mm, preferably in a range of 1/10 mm to 5/10 mm, particularly preferred in a range of 3/10 mm to 5/10 mm.

In the associated valve, the valve body is to enable closing even for very minimal vacuum. For this purpose, the weight of the valve body must be designed and adapted in a targeted fashion. This can be done by determining the thickness of the cross-section contour ("wall thickness of the valve body"). In this context, the weight force of the valve body must be adjusted against the stiffness of the valve body. When the valve body is embodied too thick, it is too heavy in order to ensure an early and thus efficient closure of the valve even at very minimal vacuums. When the valve body is embodied too thin, it will close at very minimal vacuums due to the minimal weight. However, the minimal thickness of the valve body compromises its stiffness. In this case, for high vacuums, a plastic deformation of the valve body at the valve seat at closing of the valve would have to be provided due to the minimal material thickness. The valve body would be damaged which is to be avoided.

Also, as a whole it is advantageous that a ratio of a maximum diameter of the bell-shaped cross section contour in a radial direction of the valve body to a perpendicular distance between an axial end of the guide region and a plane in which a circumferential line of an axial end of the sealing region is arranged is embodied in a range of 16/24 to 16/4, particular preferred as 16/12.

In the associated valve, the valve body is to enable closing even at very minimal vacuum. For this purpose, the buoyance of the valve body can be improved. Also, the valve body in any installation position should remain reliably centered relative to the valve seat. These two properties can be promoted or optimized in a targeted adaptation of the described ratio of "diameter to height of the valve body". In this context, the indicated values turn out to be particularly preferred for this purpose.

It is preferred that the valve body is formed of polytetrafluoroethylene, of polytetrafluoroethylene comprising fluoro and/or carbon and/or oxygen admixtures, or a thermoplastically processed polytetrafluoroethylene.

In the associated valve, the valve body is to enable closing even for very minimal vacuum. For this purpose, the weight of the valve body must be designed and adapted in a targeted fashion. This can be done here by determining the material (~density) as well as the initial thickness of the valve body. In this context, the weight force of the valve body must be matched against the stiffness of the valve body. When the valve body is formed of a material that is too dense, it is too heavy in order to ensure an early and thus efficient closure of the valve even at very minimal vacuums. When the valve body is made of a material with a density that is too low, it will close at very minimal vacuums due to the minimal weight. However, the minimal density of the material of the valve body compromises its stiffness. In this case, for high vacuums, a plastic deformation of the valve body at the valve seat at closing of the valve would have to be provided due to the minimal density of the material. The valve body would be damaged which is to be avoided. The aforementioned materials are suitable for the geometry of the valve body for automotive applications at an internal combustion engine within the required temperature range of typically −40° C. to +150° C.

The aforementioned object is also solved by a valve with a valve seat and a valve body according to the invention, which are arranged in a valve housing, in that in an open state of the valve an axial end of the sealing region is in contact with a valve body holder that comprises at least one fluid-permeable flow opening.

The valve body holder fulfills three functions in the valve. On the one hand, it serves for centering the valve body in relation to the valve seat. This enables, on the one hand, a permanent centering of the valve body in relation to the valve seat. On the other hand, it also enables centering of the valve body for all conceivable installation positions of the valve that comprises the valve body; centering can be achieved for vertical or horizontal or other installation positions in relation to the direction of the force of gravity.

On the other hand, the valve body is secured against loss and reliably held within the valve.

Finally, by the distance of the contact location of the valve body at the valve body holder from the valve seat the stroke of the valve body in the valve is adjusted or determined also. In this way, the opening and closing behavior of the valve can be influenced.

The at least one fluid-permeable flow opening of the valve body holder favors oil drainage and the flow of fluid through the valve.

In this context, it is advantageous that in the open state of the valve an axial end of the guide region projects at least partially in a direction facing away from the valve body holder past a centering grid that is projecting radially from the valve seat. The end of the axial guide region projects in the open state of the valve at least partially past the centering grid. In this way, the axial end projects past the centering grid also in a closed state of the valve due to the geometry of the valve body. In this way, centering of the valve body on the valve seat is achieved. The valve body comprises a defined initial position in relation to the valve seat. This enables, on the one hand, a permanent centering of the valve body in relation to the valve seat. On the other hand, it also enables centering of the valve body for all conceivable installation positions of the valve that comprises the valve body; centering can be achieved for vertical or horizontal or other installation positions in relation to the direction of the force of gravity.

It is also preferred that in a closed state of the valve the flow guiding region is at least partially in contact with the centering grid and wherein the valve body holder comprises at least one valve body holding arm that is connected by means of welding, a press fit, and/or a form fit connection to the valve housing.

Furthermore, the centering grid serves yet another function in addition to the centering action. It protects the valve body. Should the vacuum in the valve be too high, a "pulling through" of the valve body through the valve seat by plastic deformation must be avoided. The centering grid serves this purpose in that in a closed state of the valve it comes into contact (at least partially) with the flow guiding region of the valve body. A plastic deformation of the valve body is prevented. The centering grid supports the valve body in the blocking direction of the valve.

The valve body holding arm represents the at least one fastening point of the valve body holder at the valve housing. The valve body holder can be connected with the valve housing by means of friction welding or ultrasonic welding.

Not least, it is advantageous that the form fit connection is designed as a snap connection between the valve body holder arm and the valve housing, preferably wherein at least one projection of the valve body holding arm engages at least one corresponding recess of the valve housing and/or the valve body holding arm is supported on at least one projection that is radially projecting into the valve housing.

When mounting the valve body holder in the valve housing, it is installed by means of a snap connection ("snap fit"). The valve body holder is pushed into the valve housing. In this context, the at least one projection of the valve body holding arm snaps into the at least one corresponding recess of the valve housing and/or the valve body holding arm catches at the at least one projecting projection in the valve housing. The valve body holder is thus positioned in the valve housing. Preferably, the snap connection is realized by more than two points, i.e., valve body holding arms. Preferably, three valve body holding arms are provided.

In a particularly preferred embodiment, the valve body holder comprises an axial bulge that extends at least partially circumferentially wherein in the open state of the valve a section of the valve body, in particular the flow guiding region, is axially supported at the axial bulge of the valve body holder. Due to the axial bulge, a further contact surface for the valve body at the valve body holder is provided which in the open valve state (against a pressure loading) can better dissipate the acting forces. Inner deformations of the valve body are minimized in this way so that an improved fatigue behavior is achieved, in particular an improved vibration resistance, for example, after several millions of load cycles. The axial bulge can have a tapering shape toward a free end, in particular it can be substantially conically embodied. Preferably, the axial bulge comprises at least one through opening for a media flow which can be in particular centrally positioned.

Finally, the object is solved also by a crankcase ventilation device that comprises at least one valve according to the invention.

The valve according to the invention can be used in the crankcase ventilation device for several functions. Preferably, it can be used universally for all valves provided in the crankcase ventilation device. These functions include in particular the use as non-return check valve for partial load, non-return check valve for full load, non-return check valve for fresh air (PCV), and oil return flow check valve. Venting of a crankcase can be designed efficiently in a universal and simple manner.

BRIEF DESCRIPTION OF THE DRAWINGS

Further advantages result from the following drawing description. In the drawings, embodiments of the invention are illustrated. The drawings, description, and claims contain numerous features in combination. A person of skill in the art will consider the features expediently also individually and combine them to expedient further combinations.

FIG. 12 shows a perspective view of a further valve body holder.

DESCRIPTION OF PREFERRED EMBODIMENTS

The Figures show only examples and are not to be understood as limiting.

Figure 1:
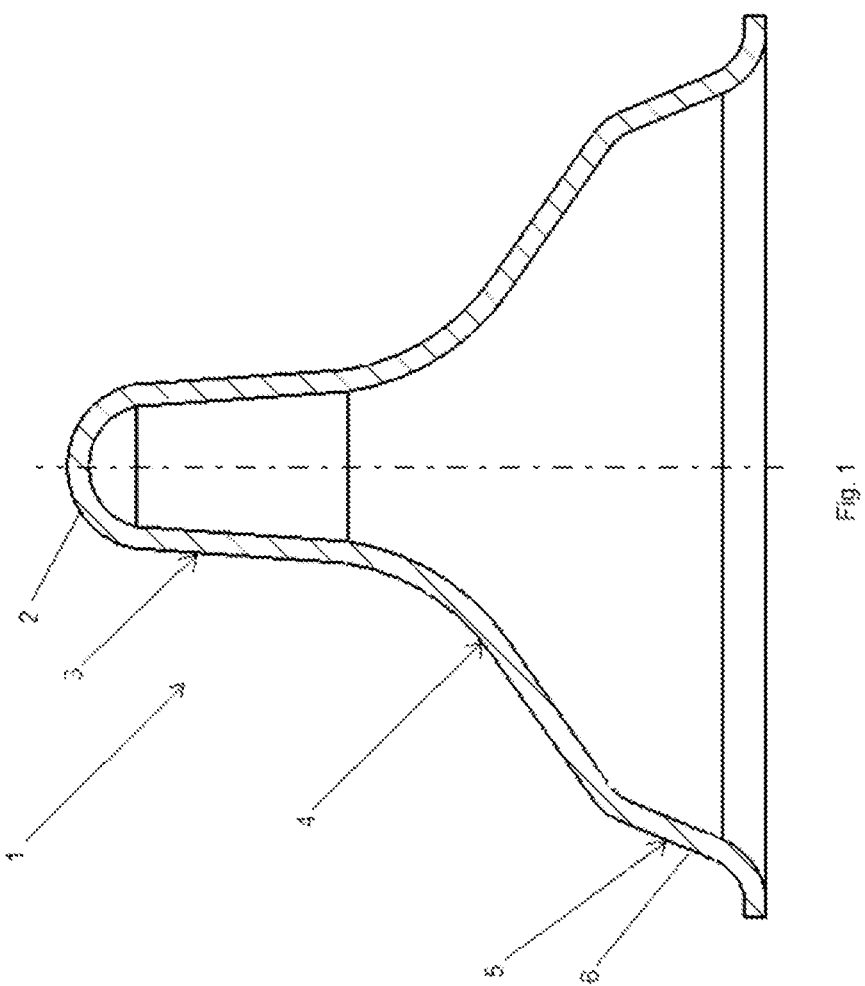
FIG. 1 shows a section illustration of a valve body according to the invention.

FIG. 1 shows a valve body 1 according to the invention. The valve body 1 comprises an envelope surface 2 and is divided into three different functional regions. A guide region 3, a flow guiding region 4, and a sealing region 5 are provided. The valve body 1 is embodied of rotational symmetry in this context. It is embodied open at one side in regard to its cross-section contour from the guide region 3 to the sealing region 5; the cross section contour strictly monotonously increases in this longitudinal direction of the valve body 1. The valve body 1 comprises thus (substantially) a bell-shaped cross section contour. It can be seen also in this context that in the illustrated embodiment the guide region 3 is embodied as a cone-shaped shaft; the sealing region 5 comprises a cone-shaped sealing section 6. In the illustrated embodiment, the three functional regions 3, 4, 5 adjoin each other without material interruption, wherein the flow guiding region 4 connects the guide region 3 with a sealing region 5. At an axial end of the guide region 3 that is facing away from the flow guiding region 4, the cross-section contour is of a closed configuration. The flow guiding region 4 is positioned in particular, viewed in radial direction, between the guide region 3 and the sealing region 5. In axial direction, the flow guiding region 4 is also positioned between the guide region 3 and the sealing region 5 because the bell-shaped cross section contour of the valve body in the longitudinal direction is embodied indeed so as to strictly monotonously increase.

Figure 2:
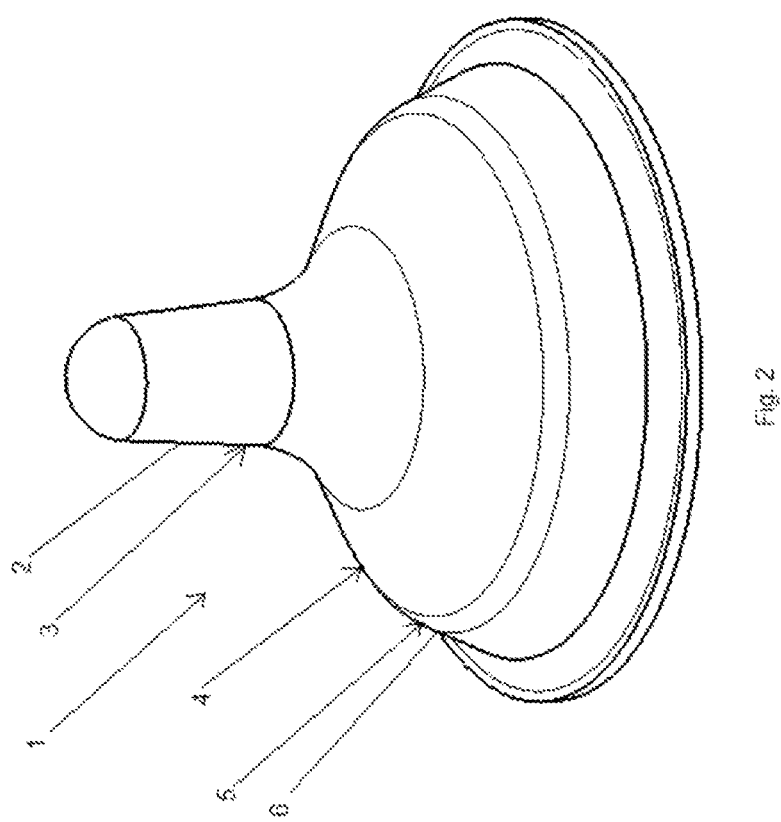
FIG. 2 shows a perspective view of the valve body according to the invention.

FIG. 2 shows a perspective view of the valve body 1 according to the invention.

Figure 3:
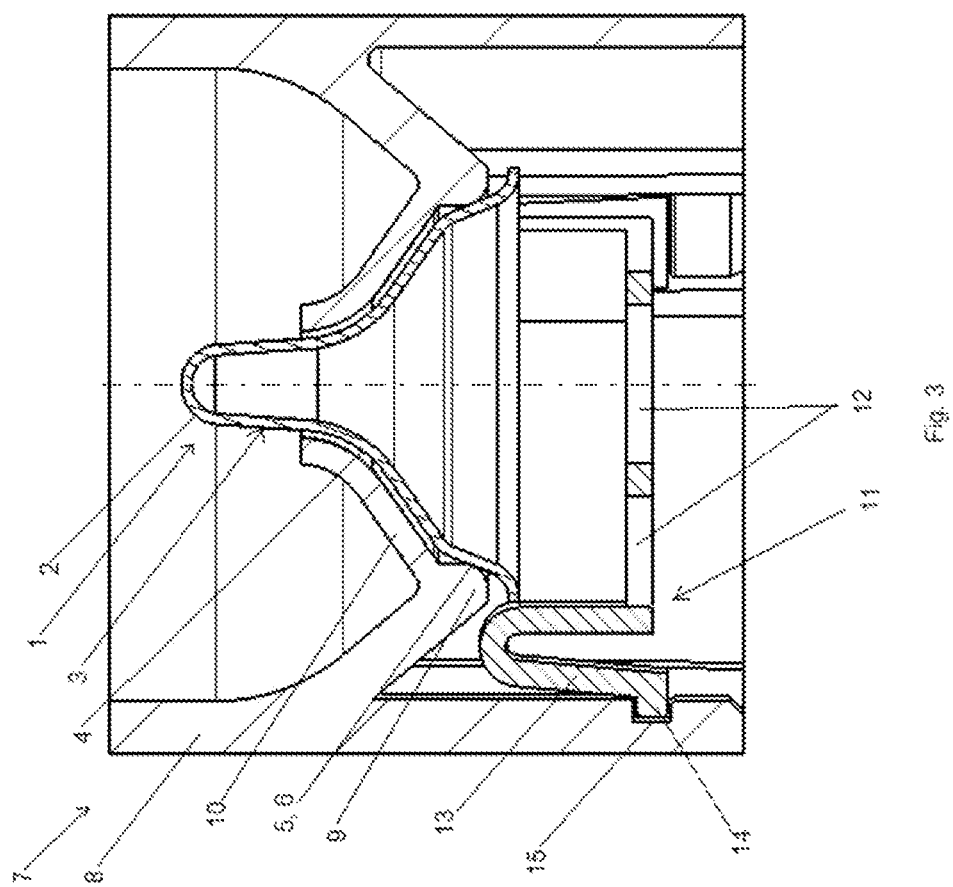
FIG. 3 shows a section illustration of a first embodiment of the valve according to the invention.

FIG. 3 shows a first embodiment of a valve 7 according to the invention with the valve body 1. The valve 7 comprises, in addition to the valve body 1, a valve housing 8 in which the valve body 1 is arranged adjacent to a valve seat 9. The valve 7 is illustrated in a closed state.

In this closed state, the guide region 3 (in the form of the cone-shaped shaft) projects, on the one hand, past the valve seat 9 at least partially with an axial end. On the other hand, the guide region 3 projects also with the axial end at least partially past a centering grid 10. The centering grid 10 is embodied to project away from the valve seat 9 in a radial direction of the valve housing 8 toward its longitudinal center axis. It surrounds the guide region 3 and follows its envelope surface 2. Accordingly, centering of the valve body 1 on the valve seat 9 is achieved. The valve body 1 comprises a defined initial position in relation to the valve seat 9. This enables, on the one hand, a permanent centering of the valve body 1 in relation to the valve seat 9. On the other hand, it also enables centering of the valve body 1 for all conceivable installation positions of the valve 7 that comprises the valve body 1; centering can be achieved for vertical or horizontal or other installation positions in relation to the direction of the force of gravity. Moreover, the centering grid 10 also has another function in addition to centering. It protects the valve body 1. In case the vacuum becomes too large in the valve 7, a "pulling through" of the valve body 1 through the valve seat 9 by plastic deformation upon closing of the valve 7 must be avoided. The centering grid 10 serves this purpose in that, in a closed state of the valve 7, it comes into contact (at least partially) with the flow guiding region 4 of the valve body 1. A plastic deformation of the valve body 1 is prevented. The centering grid 10 supports the valve body 1 in the blocking direction of the valve 7. Accordingly, guiding and centering of the valve body 1 in the valve 7 is achieved by the guide region 3.

In the closed state, moreover the sealing region 5 is contacting the valve seat 9. In this contact position, the sealing region 5 seals by means of the cone-shaped sealing section 6 against the corresponding sealing line of the valve seat 9.

It can also be seen in FIG. 3 that a valve body holder 11 is provided in the valve 7. This valve body holder 11 comprises at least one fluid-permeable flow opening 12 and at least one valve body holding arm 13.

The valve body holder 11 serves for centering and stroke limitation of the valve body 1. In an open state of the valve 7, an axial end of the sealing region 5 is contacting the valve body holder 11. The valve body 1 is secured against loss and is centered and held in a defined initial position. At the same time, due to the distance between the valve seat 9 and the valve body holder 11, the stroke of the valve body 1 is determined. In this context, the diameter of the valve body 1 at its axial end that is facing the valve body holder 11 is embodied slightly larger than the diameter of the valve seat 9. In this way, the pressure difference in the valve 7 can be kept low.

The fluid-permeable flow opening 12 serves for drainage of oil.

The valve body holder 11 illustrated in FIG. 3 is fastened by means of a snap connection in the valve housing 8. During mounting, the valve body holder 11 is pushed into the valve housing 8 until a projection 14 of the valve body holding arm 13 locks in a corresponding recess 15 of the valve housing 8.

Figure 4:
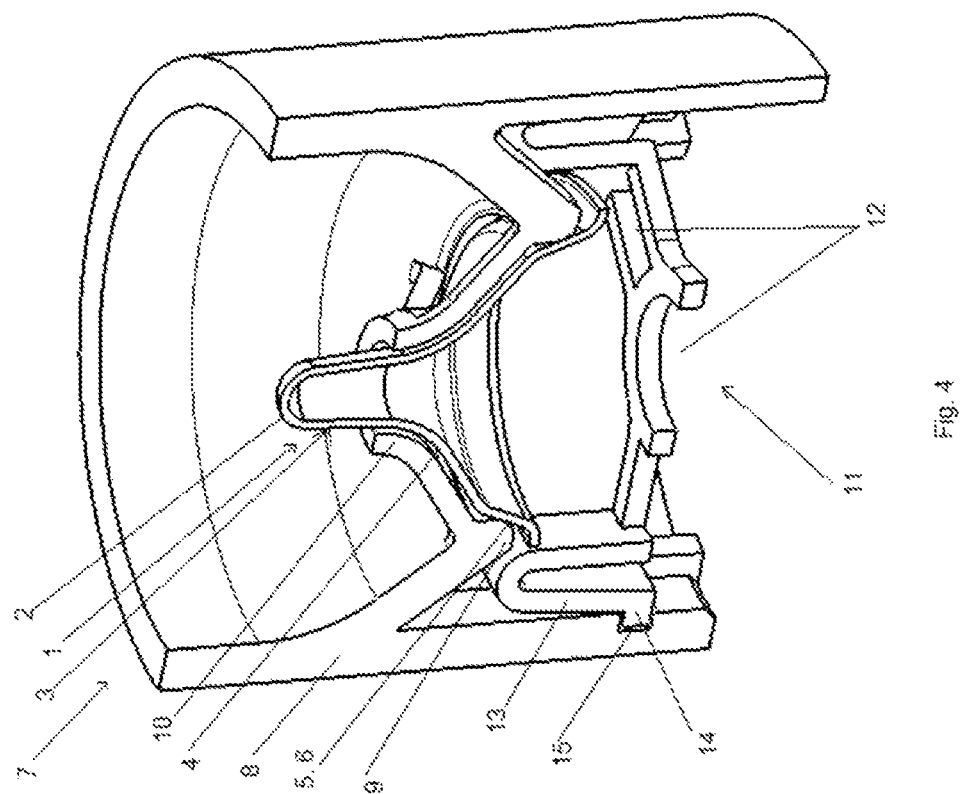
FIG. 4 shows a perspective view of the first embodiment of the valve according to the invention.

In FIG. 4, a perspective view of the embodiment of FIG. 3 is illustrated.

FIGS. 5-10 show different embodiments of the valve body holder 11, respectively.

Figure 5:
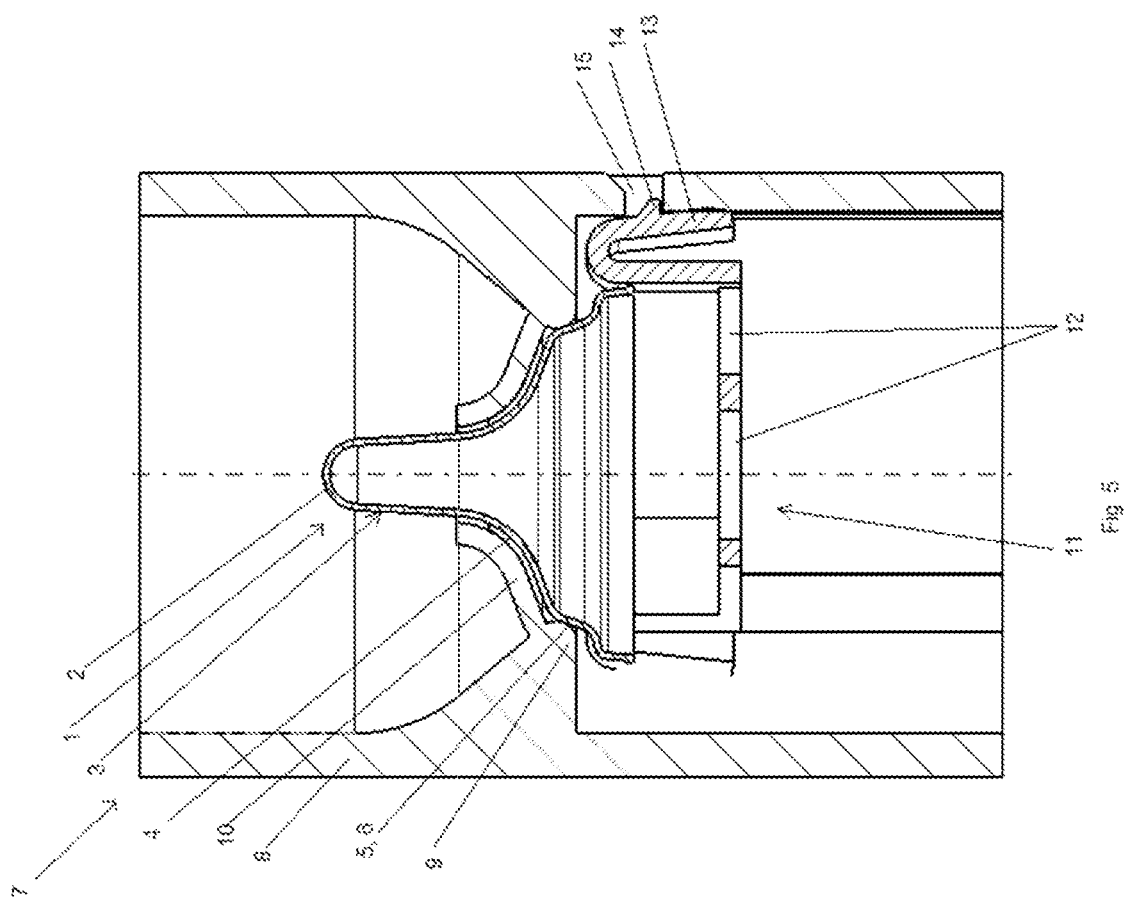
FIG. 5 shows a section illustration of a second embodiment of the valve according to the invention.

In FIG. 5, similar to FIG. 3, the valve body holding arm 13 is shown with the projection 14 which engages the recess 15 of the valve housing 8. The recess 15 is however embodied here as a through recess 15 in the valve housing 8.

Figure 6:
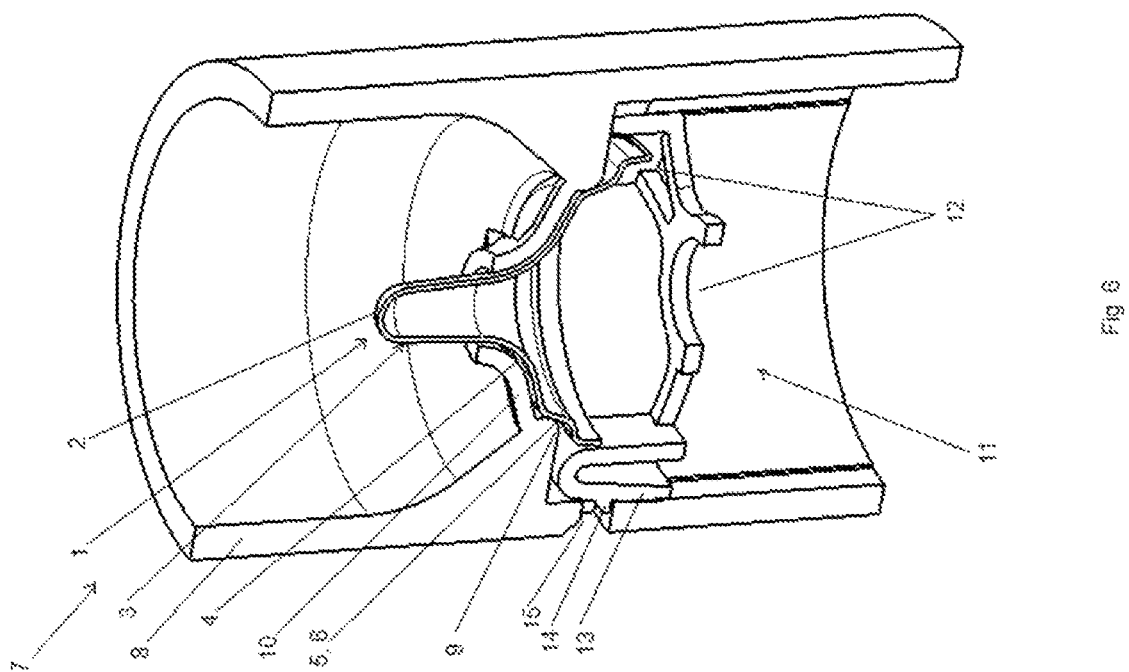
FIG. 6 shows a perspective view of the second embodiment of the valve according to the invention.

In FIG. 6, as perspective view of the embodiment of FIG. 5 is shown.

Figure 7:
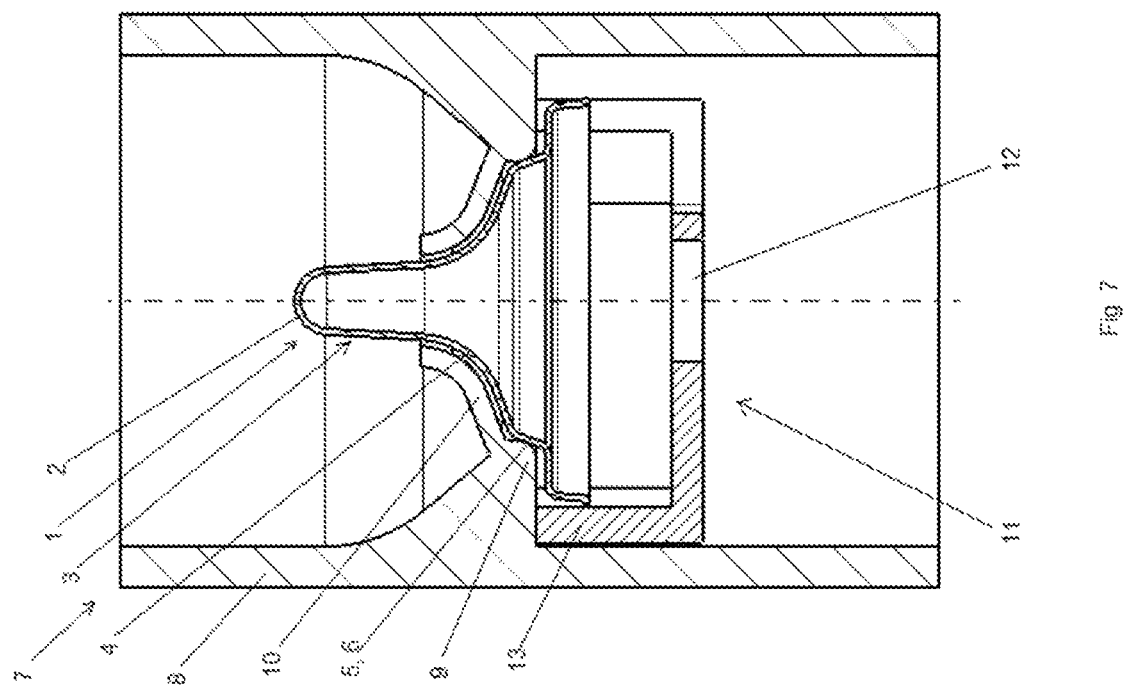
FIG. 7 shows a section illustration of a third embodiment of the valve according to the invention.

In FIG. 7, it is illustrated that the valve body holding arm 13 can be fastened also by welding at the valve housing 8. Here, friction welding and ultrasonic welding are conceivable, for example.

Figure 8:
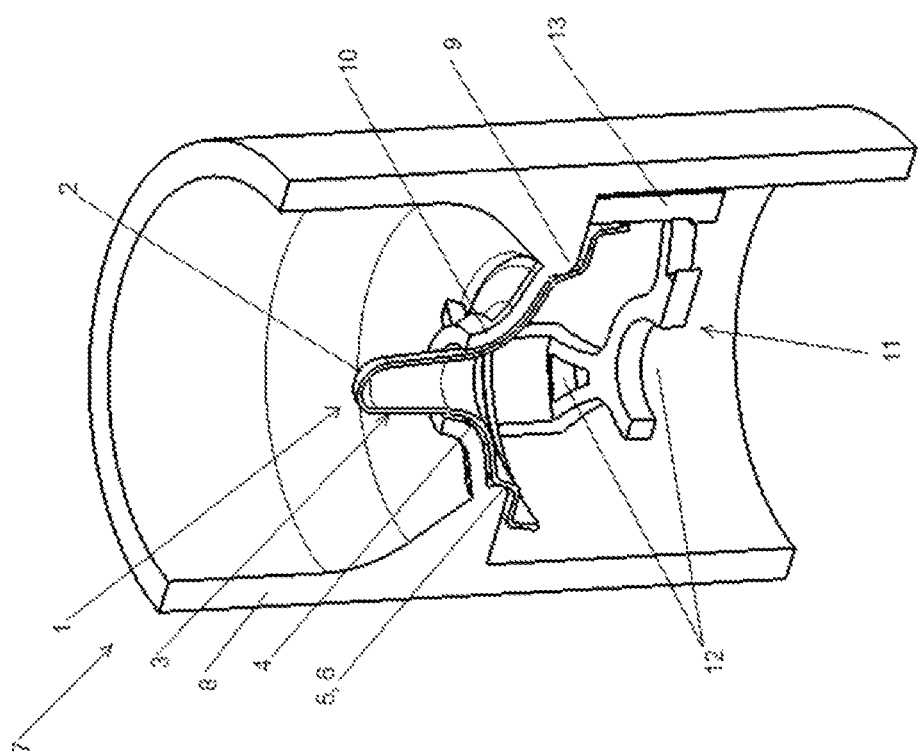
FIG. 8 shows a perspective view of the third embodiment of the valve according to the invention.

In FIG. 8, a perspective view of the embodiment of FIG. 7 is illustrated.

Figure 9:
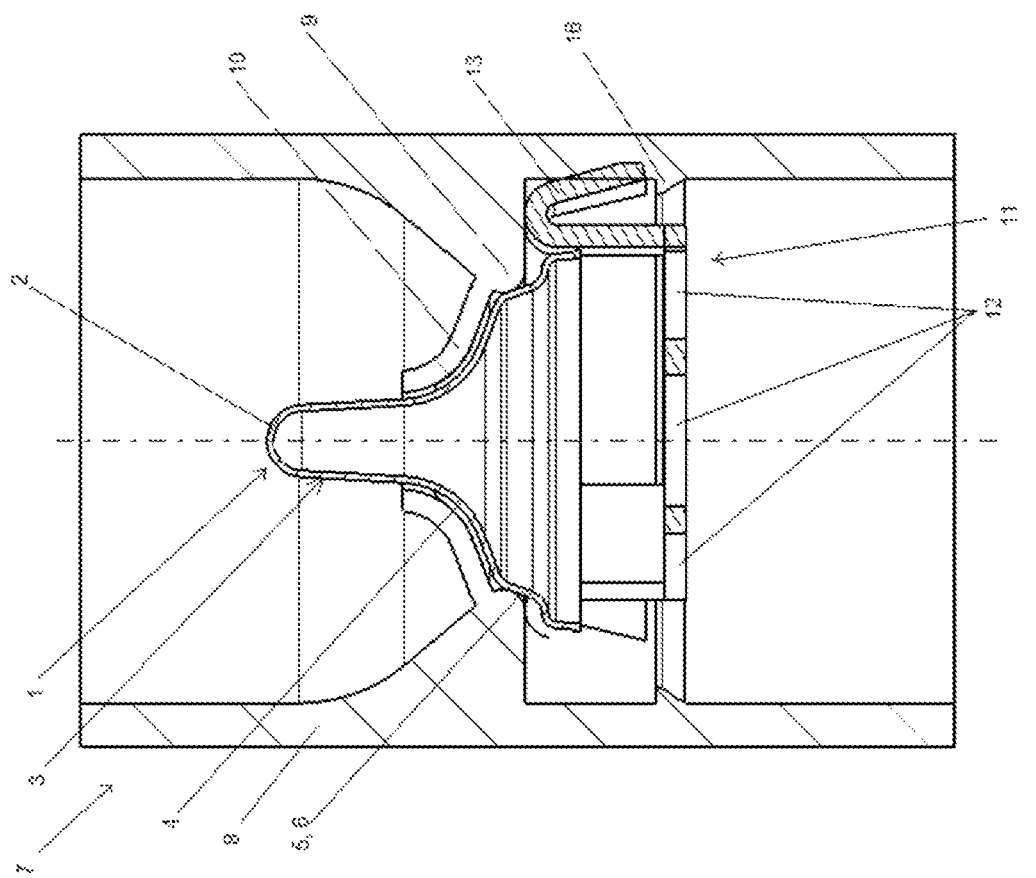
FIG. 9 shows a section illustration of a fourth embodiment of the valve according to the invention.

In FIG. 9, a projection 16 that extends circumferentially in circumferential direction is formed in the valve housing 8 on which the valve body holding arm 13 is supported and which thus forms the snap connection.

Figure 10:
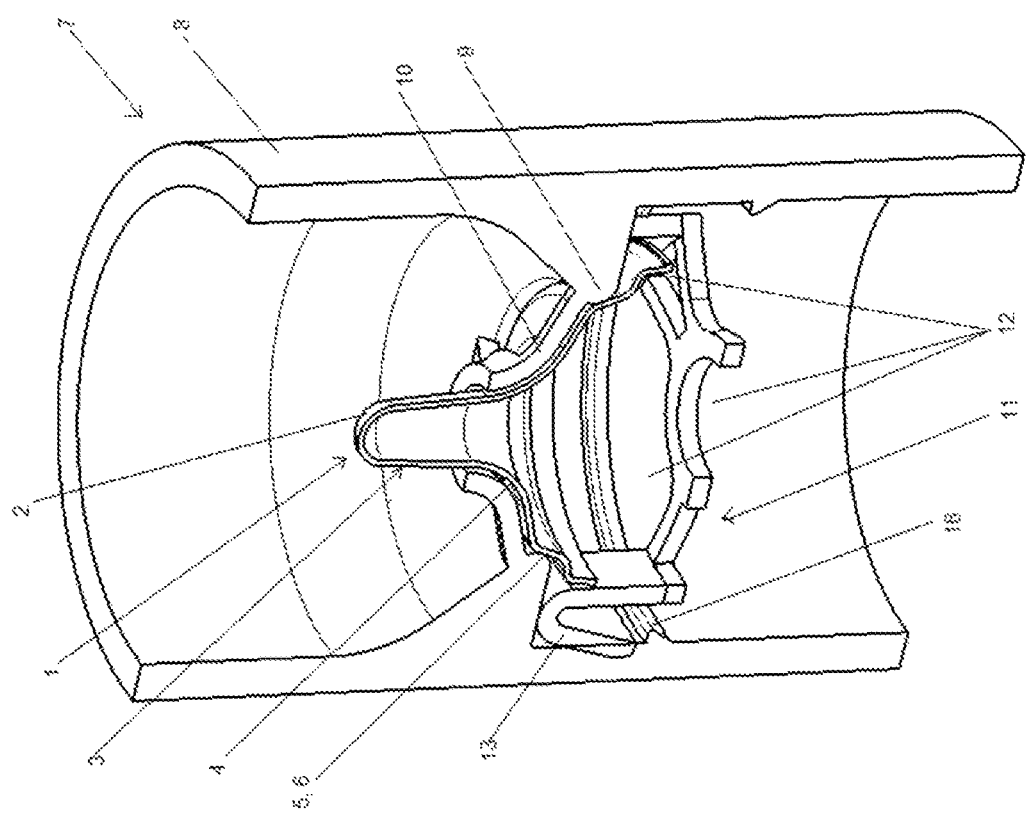
FIG. 10 shows a perspective view of the fourth embodiment of the valve according to the invention.

In FIG. 10, a perspective view of the embodiment of FIG. 9 is illustrated.

Figure 11:
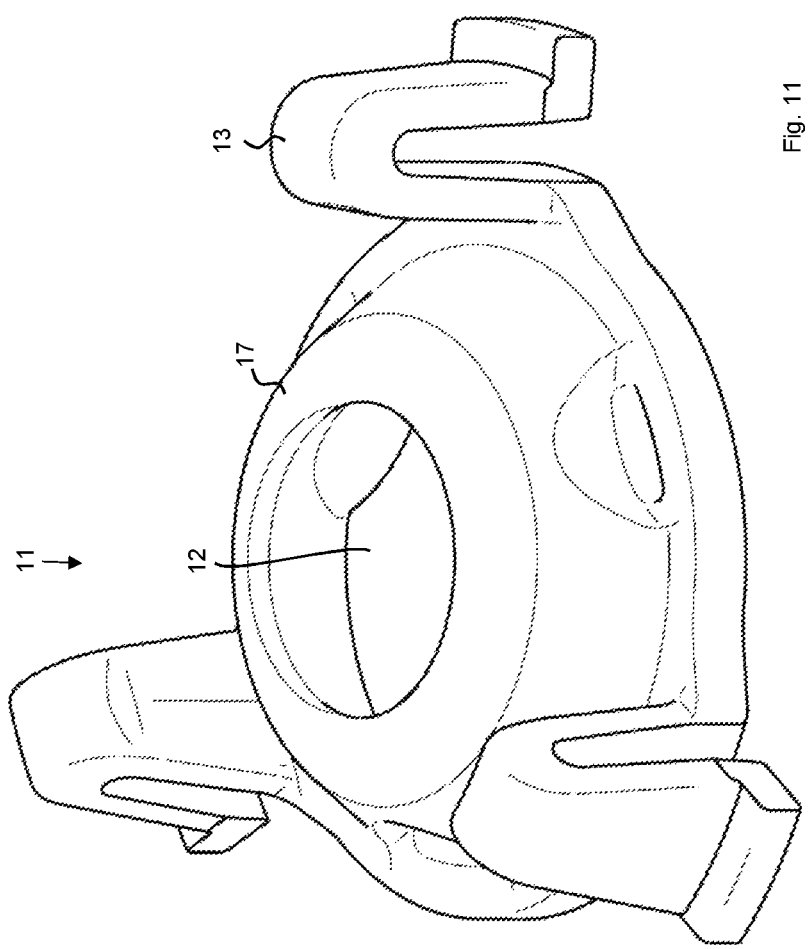
FIG. 11 shows a perspective view of a valve body holder.

In FIG. 11, a slightly modified valve body holder 11 is illustrated which is suitable for use in the herein described embodiments of valves. The valve body holder 11 comprises in addition to the valve body holding arms 13 for attachment in the valve housing a central bulge 17 which extends completely about the circumference and provides a contact surface for the valve body in an open valve state, wherein the valve body in particular is contacting the bulge 17 with its flow guiding region. Due to the axial bulge 17, a further contact surface for the valve body at the valve body holder is thus created which in the open valve state (against a pressure loading) can better dissipate the acting forces. Inner deformations of the valve body are minimized in this way so that an improved fatigue behavior is achieved, in particular an improved vibration resistance, for example, after several millions of load cycles. The axial bulge 17 comprises a shape tapering toward its free end. Moreover, the axial bulge 17 comprises at least one centrally arranged flow opening for a media flow.

In the further embodiment of FIG. 12, support webs 18 are provided, here three pieces, in addition to the axial bulge 17 and are arranged distributed about the circumference of the valve body holder 11. The support webs 18 extend axially from an outer circumference of the valve body holder 11 and are positioned in radial direction outwardly of the axial bulge 17. The support webs 18 are configured to guide the valve body in radial direction during its stroke and to prevent its tilting.

What is claimed is:

1. A valve body for a valve, the valve body comprising:
an envelope surface comprising a bell-shaped cross section contour in a longitudinal direction of the valve body;
the envelope surface comprising
a guide region configured to guide the valve body in a valve seat and further comprising
a sealing region configured to contact fluid-tightly the valve seat,
wherein the sealing region adjoins in the longitudinal direction the guide region;
wherein the bell-shaped cross section contour in the longitudinal direction from the guide region to the sealing region is open at one side and increases strictly monotonously;
wherein the valve body is formed of a thermoplastic polyhalogen olefin,
wherein a thickness of the bell-shaped cross section contour is in a range of 1/10 mm to 1 mm.

2. The valve body according to claim 1, wherein
the guide region is formed as a cone-shaped shaft extending in the longitudinal direction and
wherein the sealing region comprises
a cone-shaped sealing section,
wherein the bell-shaped cross section contour, viewed in the longitudinal direction, is closed at a side of the guide region facing away from the sealing region.

3. The valve body according to claim 1, wherein
the bell-shaped cross section contour further comprises a flow guiding region,
wherein, for an adaptation of a flow resistance of the valve body, the flow guiding region connects the guide region and the sealing region to each other at least in sections thereof without material interruptions.

4. The valve body according to claim 3, wherein
the flow guiding region, viewed in a radial direction of the valve body, is arranged between the guide region and the sealing region.

5. The valve body according to claim 1, wherein
the polyhalogen olefin is a polytetrafluoroethylene; a polytetrafluoroethylene comprising one or more admixtures selected from a fluoro admixture, a carbon admixture, and an oxygen admixtures; or a thermoplastically processed polytetrafluoroethylene.

6. A valve body for a valve, the valve body comprising:
an envelope surface comprising a bell-shaped cross section contour in a longitudinal direction of the valve body;
the envelope surface comprising
a guide region configured to guide the valve body in a valve seat and further comprising
a sealing region configured to contact fluid-tightly the valve seat,
wherein the sealing region adjoins in the longitudinal direction the guide region;
wherein the bell-shaped cross section contour in the longitudinal direction from the guide region to the sealing region is open at one side and increases strictly monotonously;
wherein the valve body is formed of a thermoplastic polyhalogen olefin,
wherein the sealing region comprises
a cone-shaped sealing section,
wherein the cone-shaped sealing section comprises
a cone angle in a range between 25 degrees and 65 degrees.

7. The valve body according to claim 6, wherein
a ratio of a maximum diameter of the bell-shaped cross section contour measured in a radial direction of the valve body relative to a perpendicular distance, measured between an axial end of the guide region and a plane in which a circumferential line of an axial end of the sealing region is arranged, is in a range of 16/24 to 16/4.

8. A valve comprising:
a valve housing;
a valve seat arranged in the valve housing;
a valve body holder arranged in the valve housing and comprising
at least one fluid-permeable flow opening;
a valve body arranged in the valve housing,
wherein the valve body comprises
an envelope surface comprising
a bell-shaped cross section contour in a longitudinal direction of the valve body,
wherein the envelope surface comprises
a guide region configured to guide the valve body in the valve seat and
further comprises a sealing region configured to contact fluid-tightly the valve seat,
wherein the sealing region adjoins in the longitudinal direction the guide region,
wherein the bell-shaped cross section contour in the longitudinal direction from the guide region to the sealing region is open at one side and increases strictly monotonously,
wherein a thickness of the bell-shaped cross section contour is in a range of 1/10 mm to 1 mm, and
wherein the valve body is formed of a thermoplastic polyhalogen olefin;
wherein the valve is configured to be transferred by a displacement of the valve body in the longitudinal direction of the valve body from a closed state into an open state:
wherein, in the open state of the valve, an axial end of the sealing region is in contact with the valve body holder.

9. The valve according to claim 8, further comprising
a centering grid projecting radially away from the valve seat,
wherein, in the open state of the valve, an axial end of the guide region at least partially projects past the centering grid in a direction facing away from the valve body holder.

10. The valve according to claim 9, wherein,
in the closed state of the valve, a flow guiding region of the valve body is at least partially in contact with the centering grid, and
wherein the valve body holder further comprises
at least one valve body holding arm connected to the valve housing.

11. The valve according to claim 10, wherein
the at least one valve body holding arm is connected to the valve housing by welding, by press fit, or by a form fit connection.

12. The valve according to claim 8, wherein
the valve body holder comprises
an axial bulge that extends at least partially circumferentially,
wherein a section of the valve body is axially supported at the axial bulge of the valve body holder in the open state of the valve.

13. The valve according to claim 12, wherein
the section of the valve body axially supported at the axial bulge of the valve body holder is a flow guiding region of the valve body.

14. A crankcase ventilation device comprising at least one valve according to claim 8.

15. A valve comprising:
a valve housing;
a valve seat arranged in the valve housing;
a valve body holder arranged in the valve housing and comprising
at least one fluid-permeable flow opening;
a valve body arranged in the valve housing,
wherein the valve body comprises
an envelope surface comprising
a bell-shaped cross section contour in a longitudinal direction of the valve body,
wherein the envelope surface comprises
a guide region configured to guide the valve body in the valve seat and
further comprises a sealing region configured to contact fluid-tightly the valve seat,
wherein the sealing region adjoins in the longitudinal direction the guide region,
wherein the bell-shaped cross section contour in the longitudinal direction from the guide region to the sealing region is open at one side and increases strictly monotonously, and
wherein the valve body is formed of a thermoplastic polyhalogen olefin;
wherein the valve is configured to be transferred by a displacement of the valve body in the longitudinal direction of the valve body from a closed state into an open state:
wherein, in the open state of the valve, an axial end of the sealing region is in contact with the valve body holder,
wherein the valve further comprises
a centering grid projecting radially away from the valve seat,
wherein, in the open state of the valve, an axial end of the guide region at least partially projects past the centering grid in a direction facing away from the valve body holder
wherein in the closed state of the valve, a flow guiding region of the valve body is at least partially in contact with the centering grid, and
wherein the valve body holder further comprises
at least one valve body holding arm connected to the valve housing;
wherein the at least one valve body holding arm is connected by a snap connection to the valve housing.

16. The valve according to claim 15, wherein
the at least one valve body holding arm comprises
at least one projection engaging at least one corresponding recess of the valve housing to form the snap connection.

17. The valve according to claim 15, wherein
the valve housing comprises
at least one projection that projects radially inwardly into an interior of the valve housing,
wherein the at least one valve body holding arm is supported on the at least one projection to form the snap connection.

* * * * *